United States Patent
Oswald et al.

[11] 3,883,618
[45] May 13, 1975

[54] O-ALKYL-S-ALKYL-O-(1-HYDROCARBYLOXY CARBONYL-1-PROPEN-2-YL)-DITHIOPHOSPHATES

[75] Inventors: Alexis A. Oswald, Mountainside; Paul L. Valint, Woodbridge; George N. Schmit, Scotch Plains, all of N.J.

[73] Assignee: Ciba-Geigy AG, Basel, Switzerland

[22] Filed: Sept. 6, 1973

[21] Appl. No.: 394,694

[30] Foreign Application Priority Data
Sept. 8, 1972    Switzerland.................. 13226/72
July 30, 1973    Switzerland.................. 11103/73

[52] U.S. Cl.............................. 260/941; 424/212
[51] Int. Cl........................... C07f 9/16; A01n 7/36
[58] Field of Search................................ 260/941

[56] References Cited
UNITED STATES PATENTS
3,662,034    5/1972    Oswald et al................ 260/941 X
3,784,589    1/1974    Large........................... 260/941

Primary Examiner—Anton H. Sutto
Attorney, Agent, or Firm—Frederick H. Rabin

[57] ABSTRACT

New thiophosphoric and dithiophosphoric acid esters of the formula

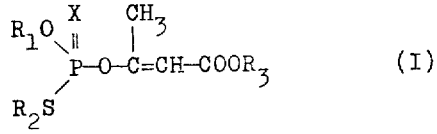

(I)

wherein $R_1$ represents methyl or ethyl, $R_2$ represents alkyl with 3 to 5 carbon atoms, $R_3$ represents alkyl with 1 to 3 carbon atoms, allyl, alkinyl with 3 to 6 carbon atoms, benzyl, α-methyl-benzyl, methoxyethyl, methoxyethoxyethyl or 1-methyl-2-methoxy-ethyl, and X represents oxygen or sulphur, and their use as insecticides and acaricides are disclosed.

12 Claims, No Drawings

O-ALKYL-S-ALKYL-O-(1-HYDROCARBYLOXY CARBONYL-1-PROPEN-2-YL)(DILTHIOPHOSPHATES)

The present invention relates to thiophosphoric and dithiophosphoric acid esters, process for their manufacture, and to their use in pest control. The compounds have the formula

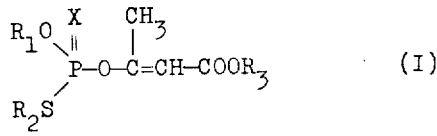

wherein $R_1$ represents methyl or ethyl, $R_2$ represents alkyl with 3 to 5 carbon atoms, $R_3$ represents alkyl with 1 to 3 carbon atoms, allyl, alkinyl with 3 to 6 carbon atoms, benzyl, α-methyl-benzyl, methoxyethyl, methoxy-ethoxyethyl or 1-methyl-2-methoxy-ethyl, and X represents oxygen or sulphur.

The alkyl and alkinyl groups represented by $R_2$ and $R_3$ can be straight-chain or branched. Examples of such groups include: methyl, ethyl, n-propyl, isopropyl, n-, i-, sec. and tert. butyl, n-pentyl, propargyl, 1-methyl-2-propinyl, 1,1-dimethyl-2-propinyl, 1-methyl-1-ethyl-2-propinyl.

Preferred compounds on account of their activity are those of the formula I, wherein $R_1$ represents ethyl, $R_2$ represents n-propyl, isobutyl particularly n-propyl, $R_3$ represents methyl, isopropyl, benzyl, α-methylbenzyl, 1-methyl-2-methoxyethyl or 1-methyl-1-ethyl-propinyl, and X represents oxygen or sulphur.

The compounds are manufactured by the following methods:

Suitable solvents or diluents are, for example, ethers and ethereal compounds, e.g., diethyl ether, dipropyl ether, dioxan, dimethoxyethane, tetrahydrofuran; amides, e.g., N,N-dialkylated carboxylic amides; aliphatic, aromatic, and halogenated hydrocarbons in particular benzene, toluene, xylene, chloroform, chlorobenzene; nitriles, e.g., acetonitrile; dimethyl sulphoxide; ketones, e.g., acetone, methyl ethyl ketone.

Some of the starting materials of the formulae II, III, and IV are known and can be manufactured by methods analogous to known ones.

The compounds of the formula I have a broad biocidal activity and are therefore suitable for combating a variety of plant and animal pests.

In particular, the compounds of the formula I possess insecticidal and acaricidal properties and can be used against all development stages, for example, eggs, larvae, pupae, nymphs, and adults of insects of the families:

Delphacidae, Blattidae, Gryllidae, Gryllotalpidae, Tettigoniidae, Cimicidae, Phyrrhocoridae, Reduviidae, Aphididae, Diaspididae, Pseudococcidae, Chrysomelidae, Coccinellidae, Bruchidae, Scarabaeidae, Dermestidae, Tenebrionidae, Tineidae, Noctuidae, Lymantriidae, Pyralidae, Culicidae, Tipulidae, Stomoxydae, Muscidae, Calliphoridae, Trypetidae, Pulicidae, as well as Acaridae of the families Tetranychidae and Dermanyssidae.

The insecticidal or acaricidal action can be substantially broadened and adapted to given circumstances by the addition of other insecticides and/or acaricides. Examples of suitable additives are: organic phosphorus compounds, derivatives of nitrophenols, formamidines, ureas, carbamates, and chlorinated hydrocarbons.

1) 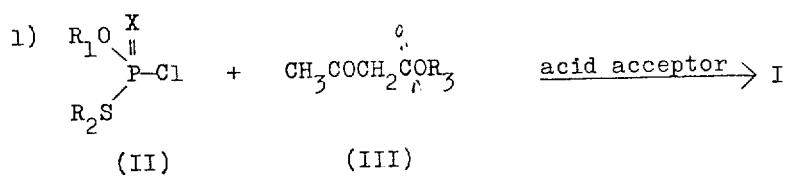

2) 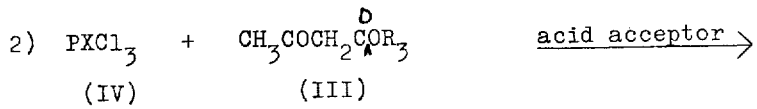

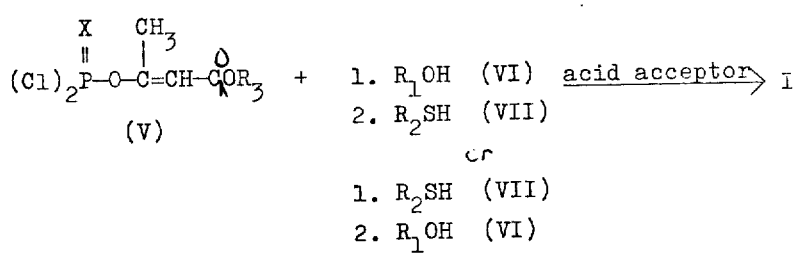

Suitable acid acceptors are: tertiary amines, e.g., trialkylamines, pyridine, dialkyl anilines; inorganic bases, e.g., hydroxides; carbonates and bicarbonates of alkali metals and alkaline earth metals.

Processes 1 and 2 are carried out at a reaction temperature between −10° and +100°C., in particular between 20° and 80°C, at normal pressure and in solvents or diluents.

The compounds of the formula I may be used as pure active substance or together with suitable carriers and/or additives. Suitable carriers and additives can be solid or liquid and correspond to the substances conventionally used in formulation technology, for example natural or regenerated substances, solvents, dispersants, wetting agents, adhesives, thickeners, binders and/or fertilisers.

For application, the compounds of the formulae I and Ia may be processed to dusts, emulsion concentrated, granules, dispersions, sprays, to solutions or suspensions, in the conventional formulation which is commonly employed in application technology.

The agents according to the invention are manufactured in known manner by intimately mixing and/or grinding active substances of the formulae I with the suitable carriers, optionally with the addition of dispersants or solvents which are inert towards the active substances. The active substances may take, and be used in, the following forms:

Solid forms

Dusts, tracking agents, granules, coated granules, impregnated granules and homogeneous granules.

Liquid forms a. active substances which are dispersible in water: wettable powders, pasts, emulsions;

b. solutions.

The content of active substance in the above described agents is between 0.1 percent to 95 percent, in which connection it should be mentioned that, in the case of application from aircraft or some other suitable means of application, it is possible to use concentrations of up to 99.5 percent or even pure active substance.

The active substances of the formula I can, for example, be formulated as follows:

Dusts

The following substances are used to manufacture (a) a 5 percent and (b) a 2 percent dust:
 a. 5 parts of active substance
    95 parts of talcum
 b. 2 parts of active substance
    1 part of highly disperse silicic acid
    97 parts of talcum.

The active substances are mixed with the carriers and ground.

Granules

The following substances are used to produce 5 percent granules:
 5 parts of active substance,
 0.25 parts of epichlorohydrin,
 0.25 parts of cetyl polyglycol ether,
 3.50 parts of polyethylene glycol,
 91 parts of kaolin (particle size 0.3–0.8 mm).

The active substance is mixed with epichlorohydrin and dissolved with 6 parts of acetone; the polyethylene glycoland cetyl polyglycol ether are then added. The thus obtained solution is sprayed on kaolin, and the acetone subsequently evaporated in vacuo.

Wettable powder

The following constituents are used for the preparation of (a) a 40 percent, (b) and (c) a 25 percent, and (d) a 10 percent wettable powder:
 a. 40 parts of active substance,
    5 parts of sodium lignin sulphonate,
    1 part of sodium dibutyl-naphthalene sulphonate,
    54 parts of silicic acid.
 b. 25 parts of active substance,
    4.5 parts of calcium lignin sulphonate,
    1.9 parts of Champagne chalk/hydroxyethyl cellulose mixture (1:1),
    1.5 parts of sodium dibutyl naphthalene sulphonate,
    19.5 parts of silicic acid,
    19.5 parts of Champagne chalk,
    28.1 parts of kaolin.
 c. 25 parts of active substance,
    2.5 parts of isooctylphenoxy-polyoxyethylene-ethanol,
    1.7 parts of Champagne chalk/hydroxyethyl cellulose mixture (1:1),
    8.3 parts of sodium aluminium silicate,
    16.5 parts of kieselguhr,
    46 parts of kaolin.
 d. 10 parts of active substance,
    3 parts of a mixture of the sodium salts of saturated fatty alcohol sulphates,
    5 parts of naphthalenesulphonic acid/formaldehyde condensate,
    82 parts of kaolin.

The active substances are intimately mixed, in suitable mixers, with the additives, the mixture being then ground in the appropriate mills and rollers. Wettable powders are obtained which can be diluted with water to give suspensions of any desired concentration.

Emulsifiable concentrates

The following substances are used to produce (a) a 10 percent and (b) a 25 percent emulsifiable concentrate:
 a. 10 parts of active substance,
    3.4 parts of epoxidised vegetable oil,
    13.4 parts of a combination emulsifier consisting of fatty alcohol polyglycol ether and alkylarylsulphonate calcium salt,
    40 parts of dimethylformamide,
    43.2 parts of xylene.
 b. 25 parts of active substance,
    2.5 parts of epoxidised vegetable oil,
    10 parts of an alkylarylsulphonate/fatty alcohol-polyglycol ether mixture,
    5 parts of dimethylformamide,
    57.5 parts of xylene.

From these concentrates it is possible to produce, by dilution with water, emulsions of any desired concentration.

Spray

The following constituents are used to prepare a 5 percent spray:
 5 parts of active substance,
 1 part of epichlorohydrin,
 94 parts of benzine (boiling limits 160°–190°C).

Example 1

O-ethyl-S-(n)propyl-O-(1-carbomethoxy-1-propen-2-yl)-thiolphosphate 22.4 g. of potassium-t-butylate and 23.2 g of acetylacetic acid methyl ester are added to 100 ml of dimethyl formamide. 40 g of O-ethyl-S-(n)propyl-thiochlorophosphate are added dropwise at 20° to 30°C and the reaction mixture is stirred for 16 hours at room temperature. The solvent is subsequently removed in vacuo at 60°C bath temperature, the residue is taken up in 100 ml of methylene chloride and washed twice with 30 ml of normal sodium hydroxide solution each time. The solvent is evaporated in vacuo to yield the compound of the formula $$\begin{array}{c} C_2H_5O \\ \diagdown \\ (n)C_3H_7S \diagup \end{array} \overset{O}{\underset{\|}{P}} -O-\overset{CH_3}{\underset{|}{C}}=CH-COOCH_3$$

with a boiling point pf 90°C/0.001 Torr and a refractive index of $n_D25 = 1.4818$.

The following compounds are also manufactured in analogous manner:

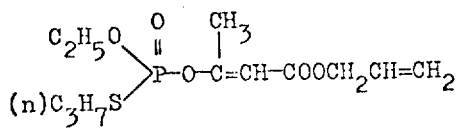   $n_D^{25} = 1,4815$
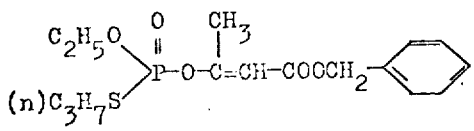   $n_D^{25} = 1,5198$
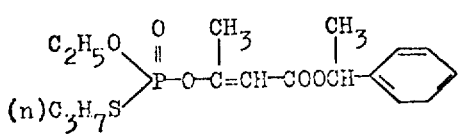   $n_D^{25} = 1,5140$
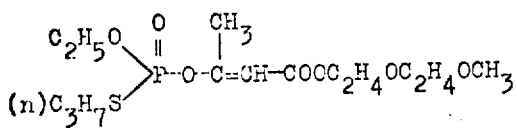   $n_D^{25} = 1,4795$
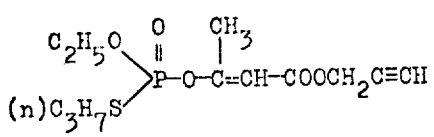   $n_D^{25} = 1,504$
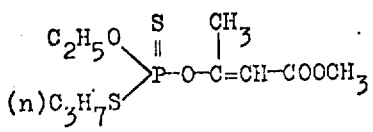   $n_D^{25} = 1,5180$
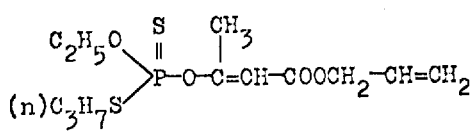   $n_D^{25} = 1,5051$
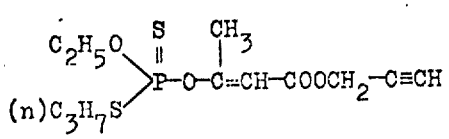   $n_D^{25} = 1,504$
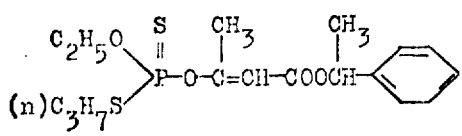   $n_D^{25} = 1,5223$ —Continued
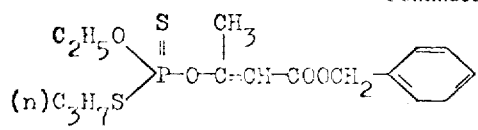
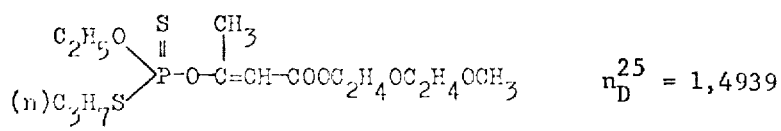     $n_D^{25} = 1.4939$
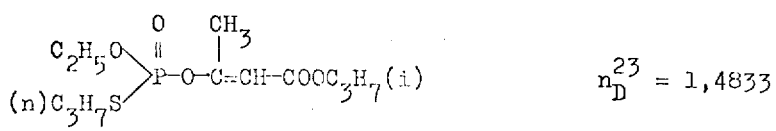     $n_D^{23} = 1.4833$
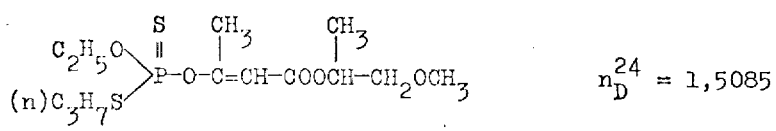     $n_D^{24} = 1.5085$
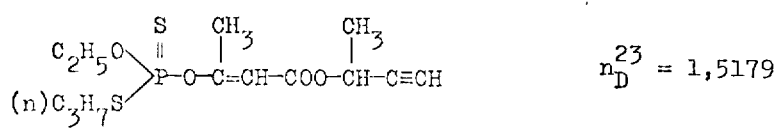     $n_D^{23} = 1.5179$
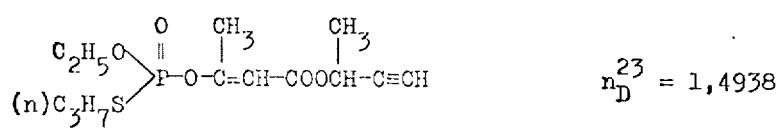     $n_D^{23} = 1.4938$
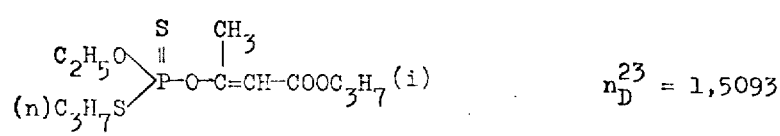     $n_D^{23} = 1.5093$
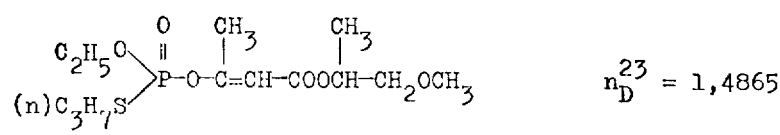     $n_D^{23} = 1.4865$
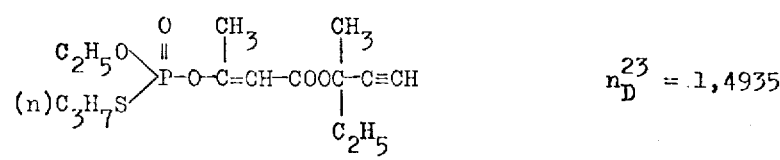     $n_D^{23} = 1.4935$
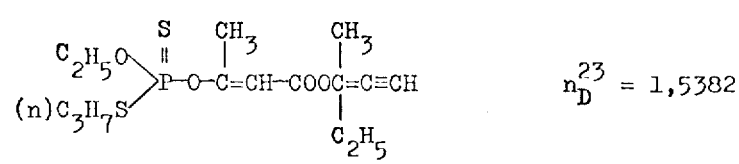     $n_D^{23} = 1.5382$ —Continued

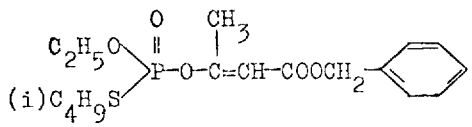 $n_D^{20} = 1,5248$

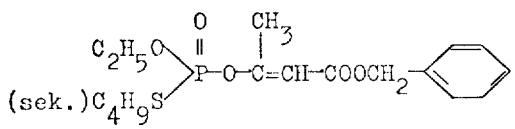 $n_D^{20} = 1,5222$

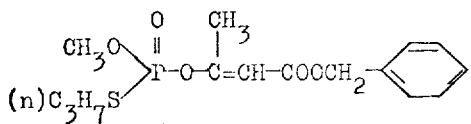 $n_D^{20} = 1,5287$

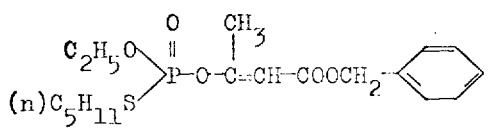 $n_D^{20} = 1,5152$

Example 2

A. Insecticidal ingest poison action

Tobacco plants were sprayed with a 0.05 percent aqueous emulsion (obtained from a 10 percent emulsifiable concentrate). After the coating had dried, the tobacco plants were populated with Spodoptera littoralis larvae L₃ and Heliothis virescens larvae L₃. The test was carried out at 24°C and 60 percent relative humidity. In the above test, the compounds according to Example 1 exhibited good ingest poison action against Spodoptera littoralis and Heliothis virescens.

B. Insecticidal contact action

Broad beans (Vicia faba) reared in pots were infected with about 200 leaflice (Aphis fabae) per plant one day before the application. A spray broth in a concentration of 1,000 ppm (prepared from a 25 percent wettable powder) was applied with a compressed air spray to the leaves populated with lice. Evaluation took place 24 hours after the application. In the above test, the compounds according to Example 1 exhibited good contact action against Aphis fabae.

Example 3

Action against Chilo suppressalis

Six rice plants at a time of the variety Caloro were transplanted into plastic pots (diameter at the top = 17 cm) and reared to a height of about 60 cm. Infestation with Chilo suppressalis larvae (L₁: 3–4 mm long) took place 2 days after the active substance had been applied in granule form to the paddy water (rate of application: 8 kg of active substance per hectare). Evaluation of the insecticidal action took place 10 days after application of the granules.

The compounds according to Example 1 exhibited good activity in the above test against Chilo suppressalis.

Example 4

Action against spider mites

Phaseolus vulgaris (dwarf beans) had an infested piece of leaf from a mass culture of Tetranychus urticae placed on them 12 hours before the test for the acaricidal action. The mobile stages which have migrated were sprayed with the emulsified test preparations from a chromatography atomiser so that the spray broth did not run off. The number of living and dead larvae, adults and eggs were evaluated after 2 to 7 days under a stereoscopic microscope and the result expressed in percentages. During the "interim," the treated plants were kept in greenhouse compartments at 25°C.

The compounds according to Example 1 exhibited good activity in the above test against eggs, larvae and adults of Tetranychus urticae.

We claim:

1. A compound of the formula

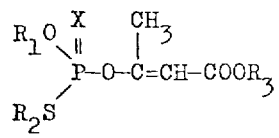

wherein R₁ represents methyl or ethyl, R₂ represents alkyl with 3 to 5 carbon atoms, R₃ represents alkyl with 1 to 3 carbon atoms, allyl, alkinyl with 3 to 6 carbon atoms, benzyl, α-methylbenzyl, methoxyethyl, methoxy-ethoxyethyl or 1-methyl-2-methoxyethyl, and X represents oxygen or sulphur.

2. A compound according to claim 1, wherein R₁ represents ethyl, R₂ represents n-propyl or isobutyl, and R₄ represents methyl, ethyl, isopropyl, benzyl, α-methylbenzyl, 1-methyl-2-methoxyethyl or 1-methyl-1-ethyl-2propinyl.

3. O-ethyl-S-(n)-propyl-O-(1-carbomethoxy-1-propen-2-yl)-thiolphosphate, according to claim 2.

4. O-ethyl-S-(n)-propyl-O-(1-benzyloxycarbonyl-1-propen-2-yl)-thiolphosphate, according to claim 2.

5. O-ethyl-S-(n)-propyl-O-[1-(α-methylbenzyloxycarbonyl)-1-propen-2-yl]-thiolphosphate, according to claim 2.

6. O-ethyl-S-(n)-propyl-O-(1-carbomethoxy-1-propen-2-yl)-dithiophosphate, according to claim 2.

7. O-ethyl-S-(n)-propyl-O-(1-benzyloxycarbonyl-1-propen-2-yl)-dithiophosphate, according to claim 2.

8. O-ethyl-S-(n)-propyl-O-(1-isopropoxycarbonyl-1-propen-2-yl)-thiolphosphate, according to claim 2.

9. O-ethyl-S-(n)-propyl-O-(1-isopropoxycarbonyl-1-propen-2-yl)-dithiophosphate, according to claim 2.

10. O-ethyl-S-(n)-propyl-O- 1-[(1-methyl-1-ethyl-2-propinyloxy)-carbonyl]-1-propen-2-yl -thiolphosphate, according to claim 2.

11. O-ethyl-S-isobutyl-O-(1-benzyloxycarbonyl-1-propen-2-yl)-thiolphosphate, according to claim 2.

12. O-ethyl-S-sec.butyl-O-(1-benzyloxycarbonyl-1-propen-2-yl)-thiolphosphate, according to claim 2.

* * * * *